United States Patent [19]

Hasegawa et al.

[11] 4,189,219

[45] Feb. 19, 1980

[54] CONTROL SYSTEM FOR FLASH PHOTOGRAPHING APPARATUS

[75] Inventors: Hiroshi Hasegawa, Tokyo; Yoshiaki Ohtsubo, Kawasaki; Sakuji Watanabe, Yono, all of Japan; Kouichi Takahata, deceased, late of Tokyo, Japan, by Kousaku Takahata, legal successor

[73] Assignee: Nippon Kogaku K.K., Tokyo, Japan

[21] Appl. No.: 806,075

[22] Filed: Jun. 13, 1977

[30] Foreign Application Priority Data

Jun. 23, 1976 [JP] Japan ................................ 51-73103

[51] Int. Cl.[2] ...................... G03B 15/05; G03B 17/38

[52] U.S. Cl. ........................................ 354/33; 354/34; 354/128; 354/145

[58] Field of Search ............................ 354/27, 32–35, 354/60 F, 139, 149, 145, 127, 128; 315/159, 241 P; 250/214 P

[56] References Cited

U.S. PATENT DOCUMENTS

| | | | |
|---|---|---|---|
| 3,638,543 | 2/1972 | Kondo | 354/35 |
| 3,648,104 | 3/1972 | Ackermann | 354/33 X |
| 3,737,721 | 6/1973 | Ogawa | 354/33 X |
| 3,776,112 | 12/1973 | Wilwerding | 354/33 |
| 3,809,954 | 5/1974 | Irgelstatter | 354/33 X |
| 4,012,665 | 3/1977 | Nakamura et al. | 354/145 |

*Primary Examiner*—L. T. Hix
*Assistant Examiner*—William B. Perkey
*Attorney, Agent, or Firm*—Fitzpatrick, Cella, Harper & Scinto

[57] ABSTRACT

A combination of a camera and a flash unit is provided with a control system for flash photographing. The control system comprises a plurality of signal generating circuits each for converting information to be transmitted between the flash unit and the camera into a signal of a predetermined level with a plurality of detecting circuits each associated with the corresponding signal generating circuits for detecting a signal of a detection level corresponding to a predetermined level, and the signal generating circuits and the associated detecting circuits forming pairs with one of each of the pairs being provided on the camera and the other being provided on the flash unit.

5 Claims, 1 Drawing Figure

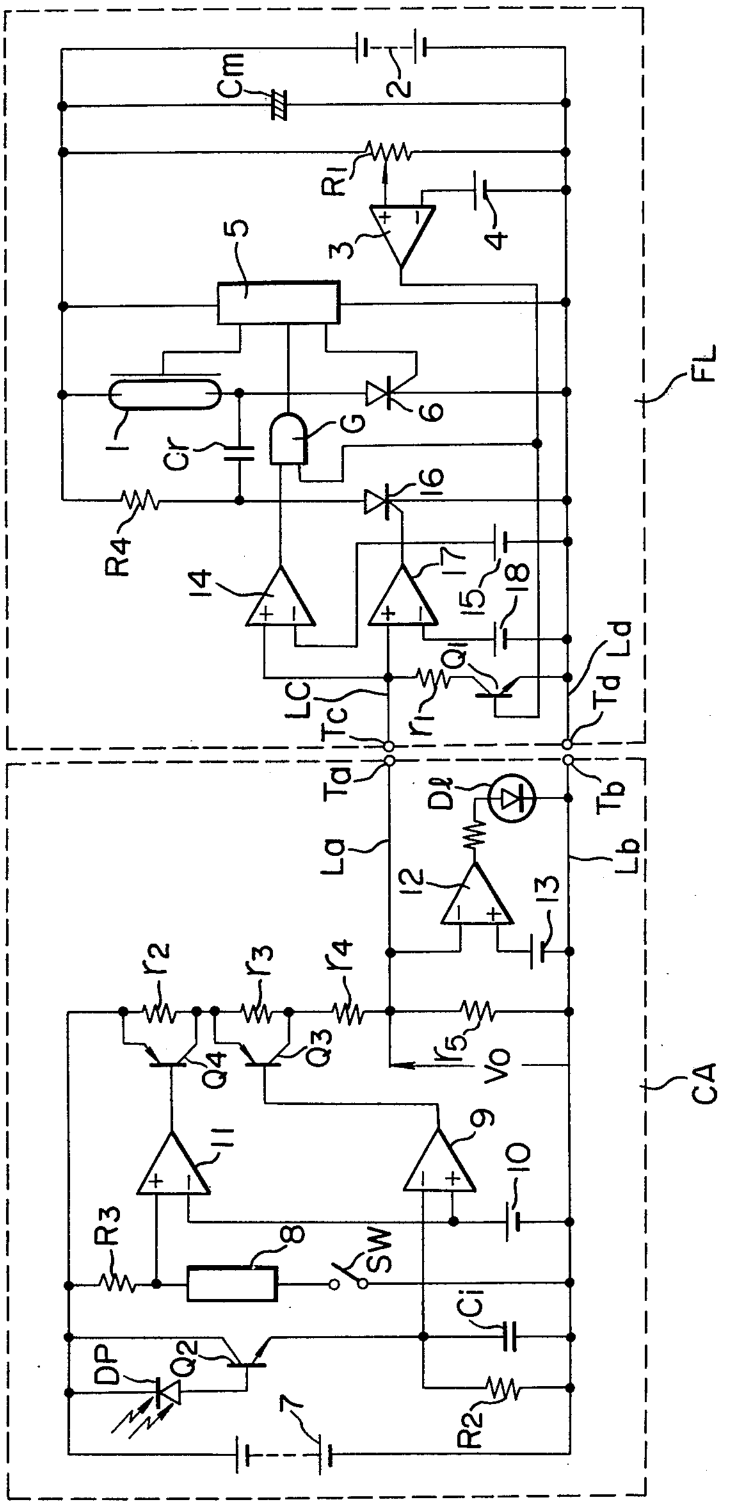
FL
CA
Cm
2
R1
3
4
5
1
Cr
G
6
16
R4
14
17
15
18
LC
Tc
r1
Q1
Td
Ld
Ta
Dℓ
Tb
La
Lb
12
13
r2
r3
r4
r5
Q4
Q3
Vo
11
9
10
R3
8
SW
Ci
DP
Q2
7
R2

CONTROL SYSTEM FOR FLASH PHOTOGRAPHING APPARATUS

BACKGROUND OF THE INVENTION

1. Field of the Invention

The present invention relates to a flash photographing apparatus comprising a flash unit capable of automatically adjusting the amount of emitted light according to the brightness of the object to be photographed, and a camera for photographing said object illuminated by the flash light from said flash unit, and more particularly, to a control system for controlling the various components included in said flash unit and camera.

2. Description of the Prior Art

In the technology of flash photographing apparatus of the class described, it has been known in recent years to employ so-called TTL light-controlled flash photographing apparatus in which a light receiving element provided on a camera receives the light reflected by an object illuminated by the flash unit and terminates the light emission from the flash unit when the aggregated amount of reflected light reaches a predetermined value, thereby controlling the light available for exposure.

Such flash photographing apparatus necessitates transmission lines for transmitting information between the camera and the flash unit, and therefore there have been required additional connecting wires and terminals for the transmission of such information in addition to the conventional information transmitting channels such as for information on the state of the synchronizing switch on the camera or information on the completion of charging of the main capacitor in the flash unit. Such arrangements have inevitably resulted in complicated wiring between the flash unit and camera and also in the possibility of malfunctions arising from incomplete electrical contacts.

SUMMARY OF THE INVENTION

We have conceived and contribute by the present invention means whereby we are able to provide a flash photographing apparatus free from the above-mentioned drawbacks and capable of transmitting the necessary information between the flash unit and camera by means of a limited number of transmitting channels.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWING

Specific embodiments of the invention have been chosen for purposes of illustration and description, and are shown in the accompanying drawings, forming a part of the specification, wherein:

The single FIGURE is a circuit diagram of one embodiment of a control device for a flash photographing apparatus in accordance with the present invention.

DETAILED DESCRIPTION OF THE INVENTION

Referring to the attached drawing, there is illustrated an example of a circuit wherein the present invention is applied to the above-mentioned TTL light-controlled flash photographing apparatus. The circuit on the camera side and that on the flash unit side are respectively represented by CA and FL. A main capacitor Cm in the FL side is adapted to accumulate the energy for causing a flash in a flash tube 1, and is electrically charged by means of a power source or a battery 2. The terminal voltage of the main capacitor Cm is detected by a resistor R1, a comparator 3 and a standard voltage source 4. A transistor Q1 connected to the output of the comparator 3 controls the conduction of the connection including a voltage dividing resistor r1 between the information transmission lines Lc and Ld. There is provided a trigger pulse generating circuit 5, the output of which is supplied to a trigger electrode of the flash tube 1 and the gate terminal of a silicon controlled rectifier 6 (hereinafter referred to as SCR) connected in the discharging circuit of said flash tube 1.

On the camera side, resistors r2 to r5 constitute a voltage-dividing circuit for dividing the terminal voltage of a power source 7. Upon reception of a quantity of light reflected by an object to be photographed and to be illuminated by the flash light from the flash tube 1, a photodiode Dp functioning as a photoelectric conversion element generates an output photocurrent which is amplified by a transistor Q2. An integrating capacitor Ci, connected to the emitter of transistor Q2, is charged with the amplified photocurrent, thus performing the integration of light. Said integrating capacitor Ci is connected to a discharge resistor R2 therefor, which is selected to be of a relatively high resistance. There is provided a one-shot multi-vibrator 8 which functions, upon closure of the synchronizing switch SW on the camera, for a determined period (several milliseconds) to connect one end of a resistor R3 to the negative terminal of the power source 7. A comparator 9 utilizes a power source 10 as the standard voltage and causes a transistor Q3 to short circuit the resistor r3 when the charged voltage of the integrating capacitor Ci exceeds the standard voltage, namely, when the integrated amount of light reflected from the object exceeds a predetermined amount. Also a comparator 11, utilizing the power source 10 as the standard voltage, causes a transistor Q4 to short circuit the resistor r2 when the synchronizing switch SW is closed. Further, a comparator 12, utilizing a power source 13 as the standard voltage, detects the on-off state of the transistor Q1 on the flash unit side and controls the function of a light-emitting diode Dl.

A comparator 14, utilizing a power source 15 as the standard voltage, detects the closure of the synchronizing switch SW of the camera side. An "AND" gate circuit G connected to the output of comparator 14 causes the trigger pulse generating circuit 5 to release a trigger pulse upon detection by the comparator 3 of the completion of charging of main capacitor Cm and further upon detection of the closure of the synchronizing switch SW by a comparator 14. A shunt circuit is composed of a resistor R4, a capacitor Cr and an SCR 16 for turning off the SCR 6 connected in the discharge circuit of flash tube 1. A comparator 17, utilizing a power source 18 as the standard voltage, detects that the charged voltage of the integrating capacitor Ci reaches a predetermined value and thereupon applies a trigger pulse to the gate of SCR 16. The resistors r1, r2 and r3 and transistors Q1, Q4 and Q3 are respectively paired and constitute respective units.

Ta, Tb, Tc and Td are connecting terminals for mutually connecting the information transmission lines La, Lb, Lc and Ld of the flash unit FL and the camera CA, wherein the lines Lb and Ld are common grounding lines of the flash unit and camera, respectively.

Now there will be given an explanation of the function of the control device explained in the foregoing.

For the purpose of explanation, it is assumed that the voltage of power source 7 on the camera side is equal to E[V], and that the resistors r1 to r5 are of the same resistance.

When the charged voltage of the main capacitor Cm is less than the discharge voltage of flash tube 1, the comparator 3 produced an L-level output to maintain the transistor Q1 in "off" state. In this state, the potential difference Vo between the information transmission channels is determined by the voltage-dividing ratio of resistors r2 to r5 and is equal to E/4 [V], in this example. The voltage e1 of the power source 13 is selected to satisfy the condition: $E/4>e1>E/7$, so that the light-emitting diode Dl is maintained turned off by the comparator 12. When the main capacitor Cm is charged to a voltage allowing discharge through the flash tube 1, the comparator 3 produces an H-level output to bring the transistor Q1 into "on" state. Thus, the voltage difference Vo between the information transmission channels is determined by the voltage-dividing ratio of the resistors r1 to r5 and becomes equal to E/7 [V], whereby the comparator 12 enables light-emitting diode Dl to indicate the completion of charging.

Upon closure of the synchronizing switch SW thereafter, the comparator 11 produces an L-level output thereby bringing the transistor Q4 into "on" state and thus short circuiting the resistor r2. The voltage difference Vo thus becomes equal to E/5 V, and in this case the power source 15 is so selected as to have a voltage e2 satisfying the condition: $E/5>e2$. In this state, therefore, the comparator 14 produces an H-level output, while the comparator 3 is producing an H-level output. Thus, the "AND" gate circuit G activates the trigger pulse generating circuit 5 to supply a trigger pulse to the flash tube 1 and the SCR 6, thereby causing the flash tube 1 to emit flash light to illuminate the object to be photographed.

The light reflected from the illuminated object is received by the photodiode Dp and resultant photocurrent is integrated by the integrating capacitor Ci. When the charged voltage of the integrating capacitor Ci reaches a predetermined value, the comparator 9 produces an L-level output to bring the transistor Q3 into "on" state, thereby short circuiting the resistor r3. In this state, the transistor Q1 is turned off since the charged voltage of the main capacitor Cm is reduced after discharging energy into the flash tube 1. Thus, the voltage difference Vo becomes equal to E/2 V, whereas the voltage e3 of the power source 18 is so selected as to satisfy the condition: $E/2 \geqq e3 > E/4$. The comparator 17 accordingly triggers the SCR 16 to turn off the SCR 6, thus terminating the light emission from the flash tube 1 and controlling the light available for exposure.

Thereafter, the voltage difference Vo returns to the initial state, E/7 [V], which is a stand-by state for the next photographing cycle.

Although in the foregoing example the transmission of information between the flash unit FL and the camera side CA is achieved by means of a signal of a positive potential with respect to the common grounding lines Lb, Ld, it is to be noted that such transmission can also be achieved by means of a signal of a negative potential.

From the foregoing description, it will be seen that the present invention contributes a plurality of signal generating circuits each for converting information to be transmitted between the flash unit and the camera into a signal of a determined level and a plurality of detecting circuits each for functioning at a detection level corresponding to the determined level, wherein either one of a paired set of the signal generating circuits and the detection circuits is provided on the flash unit while the other is provided on the camera, thus making it possible to achieve information transmission between the flash unit and the camera by means of as few as two transmission lines.

We believe that the construction and operation of our novel control system will now be understood and that the advantages thereof will be fully appreciated by those persons skilled in the art.

We claim:

1. A control system for flash photographing apparatus comprising:
   - a flash unit capable of automatically adjusting the amount of emitted flash light in accordance with brightness of an object to be photographed;
   - a camera for photographing said object illuminated with the flash light from said flash unit; and
   - a pair of electric channels electrically interconnecting said flash unit to said camera;

said flash unit comprising:
   - a main capacitor for accumulating charges for flash illumination;
   - a flash tube for emitting flash light;
   - a trigger circuit for triggering said flash tube;
   - a circuit for terminating emission of the flash light;
   - a first signal generator circuit for generating a first signal when a voltage across said main capacitor reaches a predetermined value;
   - a series arrangement of a first resistive element and a first switching device connected across the pair of electric channels, said first switching device being operative in response to the first signal;
   - a second detecting circuit for detecting a second voltage across the pair of electric channels; and
   - a third detecting circuit for detecting a third voltage across the pair of electric channels;

said camera comprising:
   - a synchronizing switch;
   - a second signal generator circuit for generating a second signal in response to an actuation of said synchronizing switch;
   - a photoelectric conversion element for receiving the flash light reflected from said object to be photographed to convert the light into an electrical signal;
   - a third signal generator circuit operative in response to the electrical signal for generating a third signal when the photoelectric conversion element receives a predetermined amount of the light;

- a second switching device operative in response to the second signal;
- a third switching device operative in response to the third signal;
- a light-emitting indicator device;
- a first detecting circuit for detecting a first voltage across the pair of electric channels;
- a power source; and
- a series arrangement of second, third and fourth resistive elements connected to said power source, said second and third resistive elements being connected in parallel to said second and third switching devices, respectively, said fourth resistive element being connected across the pair of electric channels;
- said first switching device being connected to produce, when energized, the first voltage on the pair of electric channels, said light-emitting indicator device being connected to be turned on by said first detecting circuit in response to the first voltage detected;
- said second switching device being connected to produce, when energized, the second voltage on the pair of electric channels, said trigger circuit being connected to be energized by said second detecting circuit in response to the second voltage detected;
- said third switching device being connected to produce, when energized, the third voltage on the pair of electric channels, said terminating circuit being connected to be energized by said third detecting circuit in response to the third voltage detected.

2. A control system according to claim 1, wherein said first detecting circuit comprises a comparator having an output connected to energize said light-emitting indicator device for comparing the first voltage with a first reference voltage.

3. A control system according to claim 1, wherein said second detecting circuit comprises a comparator having an output connected to said trigger circuit for comparing the second voltage with a second reference voltage.

4. A control system according to claim 1, wherein said third detecting circuit comprises a comparator having an output connected to said terminating circuit for comparing the third voltage with a third reference voltage.

5. A control system for flash photographing apparatus including a camera, a flash unit emitting flash light in accordance with the brightness of an object to be photographed, and a pair of electrical connections electrically interconnecting said flash unit to said camera, wherein said flash unit comprises:

- a flash tube emitting flash light;
- a main capacitor connected to said flash tube for storing energy for light emission in said tube;
- tube control means connected to said flash tube for energizing and deenergizing said tube;
- first signal means connected to said main capacitor for determining when a predetermined amount of energy is stored in said main capacitor, to transmit a first signal on said pair of electrical connections to said camera, said first signal means comprising first comparator means connected to said main capacitor for comparing a signal associated with a voltage across said main capacitor with a first reference voltage to produce an output representative of the predetermined energy stored in said capacitor, and a series of a first resistor and a first switching device connected across said pair of electrical connections for producing the first signal in response to the output from said comparator means;
- means connected across said pair of electrical connections for detecting a second signal to cause said tube control means to energize said flash tube, the second signal being distinctive in level from the first signal;
- means connected across said pair of electrical connections for detecting a third signal to cause said tube control means to deenergize said flash tube, the third signal being distinctive in level from the first and second signals;

said camera comprising:

- second means responsive to an actuation of a synchronizing switch for producing the second signal to transmit the second signal on said pair of electrical connections to said flash unit, said second means comprising a second resistor, and a second switching element connected in parallel with said second resistor and rendered conductive in response to an actuation of the synchronizing switch;
- photoelectric conversion means for receiving the flash light reflected from an object to be photographed to produce a corresponding electrical output;
- third signal means connected to said photoelectric conversion means for determining when said conversion means has received a predetermined amount of the flash light, to transmit the third signal on said pair of electrical connections to said flash unit, said third signal means comprising second comparator means connected to said photoelectric conversion means for comparing the corresponding electrical signal from said conversion means with a second reference voltage to produce an output representative of a predetermined amount of the flash light received by said conversion means, a third resistor, and a third switching device connected in parallel with said third resistor and rendered conductive in response to the output from said second comparator means;
- indicator means connected to said pair of electrical connections for detecting the first signal to visualize the reception of the first signal;
- said camera further comprising a voltage source, and a fourth resistor connected across said pair of electrical connections, said second, third and fourth resistors being connected in series with said voltage source.

* * * * *